United States Patent
Lee et al.

(10) Patent No.: US 7,985,782 B2
(45) Date of Patent: Jul. 26, 2011

(54) INK FOR COLOR FILTER, METHOD OF FABRICATING COLOR FILTER USING THE INK, AND COLOR FILTER FABRICATED BY THE METHOD

(75) Inventors: Kwang Ho Lee, Seoul-Si (KR); Byoung Joo Kim, Anyang-Si (KR); Jang Sub Kim, Suwon-Si (KR); Chang Hun Kwak, Suwon-Si (KR); Seong Gyu Kwon, Suwon-Si (KR); Chan Seok Park, Hwaseong-Si (KR); Kyung Ah Kim, Hwaseong-Si (KR); Hyun Il Cho, Hwaseong-Si (KR); Gil Lae Kim, Hwaseong-Si (KR); Yoon Ho Kang, Yongin-Si (KR)

(73) Assignees: Samsung Electronics Co., Ltd. (KR); Dongjin Semichem Co., Ltd. (KR)

( * ) Notice: Subject to any disclaimer, the term of this patent is extended or adjusted under 35 U.S.C. 154(b) by 380 days.

(21) Appl. No.: 11/621,250

(22) Filed: Jan. 9, 2007

(65) Prior Publication Data
US 2007/0182795 A1    Aug. 9, 2007

(30) Foreign Application Priority Data
Feb. 3, 2006    (KR) .................. 10-2006-0010885

(51) Int. Cl.
*C08F 290/14*    (2006.01)
*C08J 3/28*    (2006.01)
*G01D 11/00*    (2006.01)
*C09D 11/00*    (2006.01)

(52) U.S. Cl. .......... 522/84; 522/116; 522/121; 522/122; 347/100; 359/885; 359/891; 359/892; 523/160; 427/508; 427/466; 427/468

(58) Field of Classification Search ............... 522/84, 522/71, 113–114, 120, 116, 121–122; 523/161, 523/160; 359/885, 891–892; 430/5–7; 347/100; 427/508, 466, 468
See application file for complete search history.

(56) References Cited

U.S. PATENT DOCUMENTS

| | | | |
|---|---|---|---|
| 5,368,991 A * | 11/1994 | Uchikawa et al. | 430/288.1 |
| 2002/0128351 A1 * | 9/2002 | Kiguchi et al. | 523/161 |
| 2004/0102548 A1 * | 5/2004 | Suzuki | 524/88 |
| 2005/0042530 A1 * | 2/2005 | Kato et al. | 430/7 |
| 2005/0122450 A1 * | 6/2005 | Kang | 349/114 |
| 2006/0063858 A1 * | 3/2006 | Kang et al. | 523/160 |

OTHER PUBLICATIONS

Chemical Land, Tripropylene Glycol Methyl Ether, p1, (http://chemicalland21.com/industrialchem/solalc/TRIPROPYLENE%20GLYCOL%20METHYL%20ETHER.htm).*

* cited by examiner

*Primary Examiner* — Mark Eashoo
*Assistant Examiner* — Jessica Paul
(74) *Attorney, Agent, or Firm* — Cantor Colburn LLP

(57) ABSTRACT

The present invention provides an ink for a color filter comprising a polymer binder, a crosslinking monomer, a solvent, a pigment, and a polymerization initiator. The polymer binder comprises acrylate or methacrylate including a hydroxy group. The polymer binder may comprise 2-hydroxyethyl acrylate or 2-hydroxyethyl methacrylate.

17 Claims, 5 Drawing Sheets

US 7,985,782 B2

INK FOR COLOR FILTER, METHOD OF FABRICATING COLOR FILTER USING THE INK, AND COLOR FILTER FABRICATED BY THE METHOD

CROSS REFERENCE TO RELATED APPLICATIONS

This application claims priority to Korean Patent Application No. 10-2006-0010885, filed on Feb. 3, 2006, and all the benefits accruing therefrom under 35 U.S.C. §119, and the contents of which are incorporated herein by reference in their entirety.

BACKGROUND OF THE INVENTION

1. Field of the Invention

The present invention relates to an ink for a color filter, a method of fabricating a color filter using the ink, and a color filter fabricated by the method. More particularly, the present invention relates to an ink for a color filter capable of improving uniformity of the color filter, a method of fabricating a color filter using the ink, and a color filter fabricated by the method.

2. Description of the Related Art

A liquid crystal display ("LCD") has advantages of a smaller size, a lighter weight, and a larger display screen over a conventional cathode ray tube ("CRT"). The development of LCDs has been actively made. Particularly, LCDs have been developed sufficiently to serve as flat displays, and thus, are used as screens for mobile phones, personal digital assistants ("PDAs"), digital cameras and camcorders as well as monitors for desktop computers and large-sized displays. The range of applications for LCDs is increasingly being extended.

An LCD is manufactured by preparing a substrate equipped with a pixel electrode and a switching element, and a substrate equipped with a color layer for implementing colors, a black matrix for dividing red ("R"), green ("G"), and blue ("B") cells and performing a light-blocking function, and a common transparent electrode (e.g., Indium Tin Oxide) for use in applying a voltage to liquid crystal cells; disposing the two substrates such that the pixel electrode and the common electrode face each other; and injecting liquid crystals into a space between the two substrates. The LCD is a device for displaying an image by applying an electric field between the two electrodes, thereby allowing the electric field to move liquid crystal molecules so that light transmittance can be changed.

The color implementing process of an LCD is performed by controlling transmittance by means of passage of white light emitted from a backlight through liquid crystal cells, and mixing colors of light that has been transmitted through R, G, and B color filters disposed adjacent to one another.

The most general method for use in fabricating a color filter is a pigment dispersion method. The pigment dispersion method is a method of forming R, G, and B color filters by forming a photosensitive resin layer with pigments dispersed therein on a substrate with black matrix ("BM") patterns formed thereon, and repeatedly performing, typically three times, a photolithography process for forming a single color pattern through light exposure and development.

Since the pigment dispersion method requires formation of individual color filters for expressing respective colors, it has disadvantages in that the process is cumbersome and uses a long processing time. Furthermore, the pigment dispersion method wastes considerable amounts of raw materials (pigments, binders, etc.) since most of the photosensitive resin layer having a specific color, and which has been coated on an entire surface of a substrate, is removed during processing.

In order to overcome such problems and fabricate an inexpensive color filter by a simpler fabrication process, fabricating a color filter using an inkjet printing method is in the spotlight. The inkjet printing method is a method of forming a color filter by coating desired amounts of color inks on pixel openings formed between organic black matrix (BM) patterns. At this time, since the color inks should be coated only on the pixel openings, the organic black matrix serving as boundaries of the color inks is formed to have a high repulsive force against the color inks.

The black matrix patterns are placed at respective boundaries of color layers of the color filter. Therefore, when the color inks are coated on a substrate on which the organic black matrix (BM) patterns are formed, the high repulsive force of the organic black matrix (BM) against the color inks prevents the color inks from being mixed between adjacent pixels, improves uniformity of the pixels, and prevents the color inks from overflowing to adjacent pixels, thereby securing a predetermined error range depending on a coating position and improving a processing margin.

However, as shown in a cross-sectional view of a pixel 10 prepared with a conventional color ink in FIG. 1B, a conventional color ink 13 for a color filter has a high repulsive force against a surface 14 of the aforementioned patterned black matrix (BM) 12 and also has a high repulsive force against a surface 17 of a glass substrate 11 and a wall surface 15 of the black matrix (BM) in a pixel opening 16. Therefore, when color ink 13 is coated on a pixel opening 16 by an inkjet printing method, and because the color ink 13 has a high repulsive forces against the surface 17 of the glass substrate 11, the color ink 13 may not coat the entire surface of the glass substrate 11 in the pixel openings 16, and partially uncoated regions may be produced on the glass substrate 11 (see FIG. 1A). Furthermore, in FIG. 1B since wettability of the color ink to the wall surface of the black matrix (BM) 12 is poor, the color ink 13 is coated with a large curvature 14 on the surface of the ink which can extend onto the glass substrate 11 and thus forms an uneven surface. When the curvature 14 is increased in a color filter, this causes defects such as light leakage (light escaping from around the junction of the pixel and black matrix) and a residual image due to uneven arrangement of liquid crystals.

BRIEF SUMMARY OF THE INVENTION

Thus, the present invention has been conceived to solve the aforementioned problems. An object of the present invention is to provide an ink for a color filter capable of improving color uniformity and reliability by ensuring uniform formation of a color filter on a substrate, a method of fabricating a color filter using the ink, and a color filter fabricated by the method.

In an embodiment, the present invention provides an ink for a color filter, comprising a polymer binder, a crosslinking monomer, a solvent, a pigment, and a polymerization initiator, wherein the polymer binder comprises an acrylate or methacrylate including a hydroxy group. The polymer binder may comprise 2-hydroxyethyl acrylate or 2-hydroxyethyl methacrylate.

The polymer binder may comprise a main polymer represented by the following Formula 1:

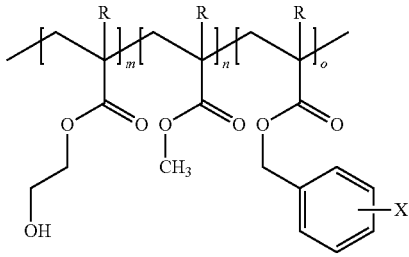

Formula 1 wherein R is hydrogen or a methyl group, X is hydrogen, a $C_{1-18}$ alkyl group, a $C_{6-18}$ aryl group, a halogen group, a nitro group or a $C_{1-18}$ alkoxy group, m is an integer that is greater than 0 and less than or equal to 10,000, and n and o are integers from 0 to 10,000.

The polymer binder may comprise a main polymer represented by the following Formula 2:

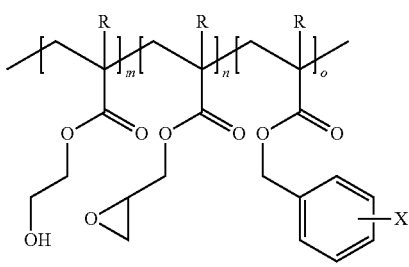

Formula 2 wherein R is hydrogen or a methyl group, X is hydrogen, a $C_{1-18}$ alkyl group, a $C_{6-18}$ aryl group, a halogen group, a nitro group or a $C_{1-18}$ alkoxy group, m is an integer that is greater than 0 and less than or equal to 10,000, and n and o are integers from 0 to 10,000.

The polymer binder may have a weight average molecular weight of 15,000 to 20,000.

The crosslinking monomer may comprise a multifunctional epoxy resin with two or more epoxy groups in one molecule. The crosslinking monomer may further comprise a melamine derivative. The crosslinking monomer may further comprise 1,4-butandioldiacrylate, 1,3-butyleneglycoldiacrylate, ethylene glycol diacrylate, pentaerythritol tetraacrylate, triethylene glycol diacrylate, polyethylene glycol diacrylate, dipentaerythritol diacrylate, sorbitol triacrylate, trimethyl propane triacrylate, dipentaerythritol polyacrylates, dipentaerythritol polymethacrylates, or a combination comprising at least one of the foregoing crosslinking monomers.

The solvent may comprise diethylene glycol ethyl ether, diethylene glycol 2-ethylhexyl ether, diethylene glycol hexyl ether, diethylene glycol methyl ether, diethylene glycol butyl ether, dipropylene glycol tert-butyl ether, dipropylene glycol methyl ether, dipropylene glycol propyl ether, tripropylene glycol, tripropylene glycol butyl ether, tripropylene glycol methyl ether, tripropylene glycol propyl ether, or a combination comprising at least one of the foregoing solvents. Specifically, the solvent has a boiling point of 230 to 250° C.

A pigment dispersion comprising 15 to 20 wt % of solids based on the total weight of pigment dispersion may be included, wherein the solids comprise a combination of pigment and dispersant. The wt % of the pigment may be 10 to 19, and the wt % of the dispersant may be 1 to 10. The ink may comprise 5 to 15 wt % of polymer binder, 2 to 8 wt % of crosslinking monomer, 40 to 50 wt % of the pigment dispersion, 0.5 to 1 wt % of the polymerization initiator, based on the total weight of polymer binder, crosslinking monomer, pigment dispersion, polymerization initiator, and solvent.

The present invention provides a method of fabricating a color filter, comprising the steps of forming black matrix patterns on a substrate; and forming a color filter by dispensing the aforementioned ink between the black matrix patterns.

The black matrix patterns may be formed of an opaque organic material. The method may further comprise the steps of forming an overcoating layer on a surface of the black matrix patterns and the color filter opposite the substrate; and forming a transparent electrode on a surface of the overcoating layer opposite the black matrix patterns and color filter.

The present invention also provides a color filter fabricated by means of the aforementioned method of fabricating a color filter. In addition, a color filter is provided comprising a patterned organic black matrix having wall surfaces, and a cure product of an ink for a color filter in which the cure product of the ink is disposed within the patterned organic black matrix, and is in contact with the wall surfaces, and the patterned black matrix and cure product of the ink are disposed on a surface of a substrate.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE INVENTION

Figure 1A:
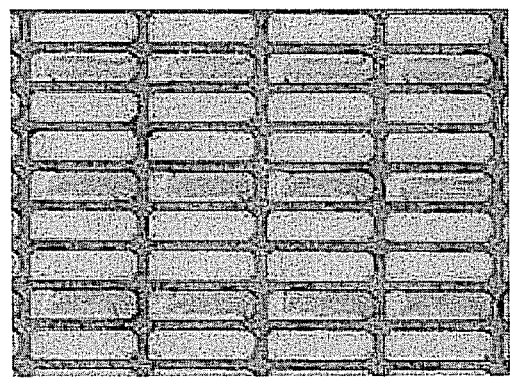
FIGS. 1A and 1B are respectively a photograph and a sectional view illustrating a case where a conventional color ink for a color filter is coated on a substrate on which organic black matrix (BM) patterns are formed.
Figure 1B:
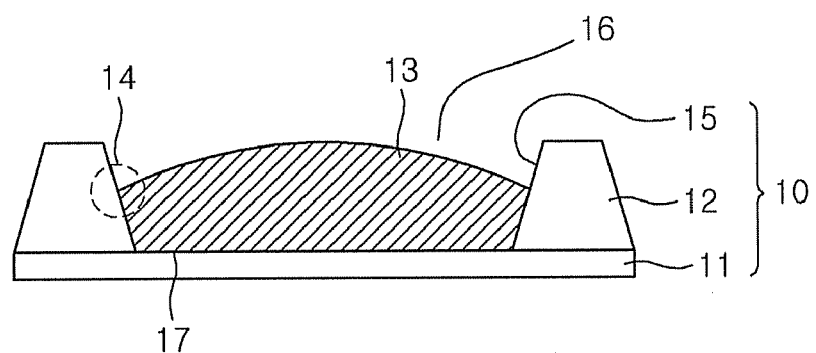

Hereinafter, an ink for a color filter according to the present invention will be described in detail.

It will be understood in the following disclosure of the present invention that as used herein, when an element is referred to as being "on" another element, it can be directly on the other element or intervening elements may be present therebetween. In contrast, when an element is referred to as being "disposed on", "deposited on", or "deposited into" another element, the elements are understood to be in at least partial contact with each other, unless otherwise specified.

The terminology used herein is for the purpose of describing particular embodiments only and is not intended to be limiting of the invention. As used herein, the singular forms "a", "an" and "the" are intended to include the plural forms as well, unless the context clearly indicates otherwise. The terms "first," "second," and the like herein do not denote any order, quantity, or importance, but rather are used to distinguish one element from another. It will be further understood that the terms "comprise", "comprises", and "comprising," when used in this specification, specify the presence of stated features, integers, steps, operations, elements, components, and combination of the foregoing, but do not preclude the presence and/or addition of one or more other features, integers, steps, operations, elements, components, groups, and combination of the foregoing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An ink for a color filter according to the present invention comprises a polymer binder, a crosslinking monomer, a solvent, a pigment, and a polymerization initiator. Particularly, the ink comprises a polymer binder containing a hydrophilic group to increase hydrophilicity of the ink for a color filter.

The polymer binder contains a hydrophilic group, and functions to stabilize the pigment which is dispersed in the ink and is present as a pigment dispersion, and improve reliability in heat resistance, light resistance and chemical resistance of a color filter. Particularly, the polymer binder may comprise hydroxy group-containing acrylate or methacrylate monomer.

The hydroxy group-containing acrylate or methacrylate monomer includes 2-hydroxyethyl(meth)acrylate, 2-hydroxypropyl(meth)acrylate, 4-hydroxybutyl(meth)acrylate, an oligomeric caprolactone or alkylene oxide modified (meth)acrylate, glycerin mono(meth)acrylate, glycerin di(meth)acrylate, glycidyl methacrylate-acrylic acid additive, trimethylol propane mono(meth)acrylate, trimethylol propane di(meth)acrylate, pentaerythritol tri(meth)acrylate, dipentaerythritol (meth)acrylates, bis(trimethylol propane) tri(meth)acrylate, or alkylene oxide-modified trimethylolpropane di(meth)acrylate. as used herein, the term "(meth)acrylate" includes any one of acrylate and methacrylate.

The polymer binder can comprise 2-hydroxyethyl acrylate or 2-hydroxyethyl methacrylate monomer.

Moreover, the polymer binder may further comprise a (meth)acrylate monomer having other functional groups in addition to the (meth)acrylate monomer having the hydroxy group. For instance, in an exemplary embodiment, the polymer binder may further comprise methyl(meth)acrylate, ethyl(meth)acrylate, butyl(meth)acrylate, benzyl(meth)acrylate, or glycidyl(meth)acrylate, or a combination comprising at least one of the foregoing (meth)acrylate monomers. In an embodiment, in addition to the monomer having the hydroxy group, the (meth)acrylate monomer having other functional group may be included solely or in a combination of two or more such (meth)acrylates.

In an embodiment, a polymer binder comprises a main polymer represented by the following Formula 1:

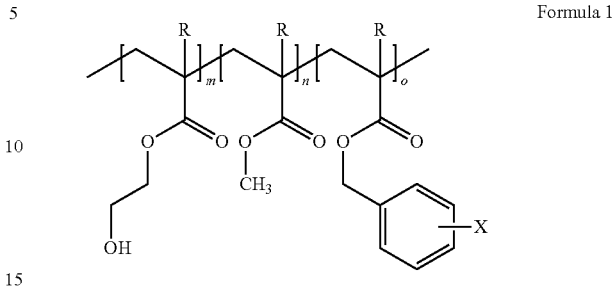

Formula 1 wherein R is hydrogen or a methyl group, X is hydrogen, a $C_{1-18}$ alkyl group, a $C_{6-18}$ aryl group, a halogen group, a nitro group or a $C_{1-18}$ alkoxy group, m is an integer that is greater than 0 and less than or equal to 10,000, and n and o are integers from 0 to 10,000.

Furthermore, the present invention provides a polymer binder comprising a main polymer represented by the following Formula 2:

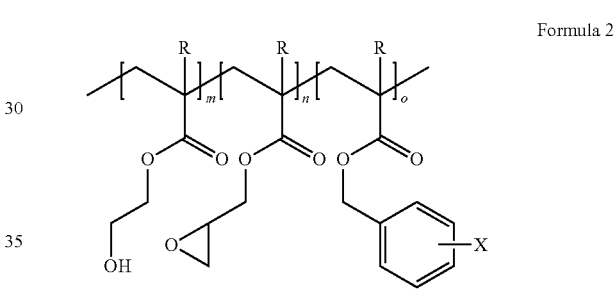

Formula 2 wherein, R is hydrogen or a methyl group, X is hydrogen, an alkyl group, an aryl group, a halogen group, a nitro group or an alkoxy group, m is an integer that is greater than 0 and less than or equal to 10,000, and n and o are integers from 0 to 10,000.

The polymer binders with these structures comprises a hydroxy group, which is a hydrophilic group, to improve hydrophilicity, thereby improving characteristics of contact with a surface to be coated, and particularly, wettability on a glass substrate upon coating of a color ink.

The polymer binder specifically comprises 10 to 50% by weight of a monomer containing the hydroxy group at a monomer ratio to the polymer binder. If the amount of the monomer comprising the hydroxy group is less than 10% by weight of the total weight of polymer binder, it is difficult to improve wettability. If the monomer ratio of the monomer comprising the hydroxy group exceeds 50% by weight of the total weight of polymer binder, storage stability is degraded.

The polymer binder has a weight average molecular weight of 5,000 to 50,000, specifically 15,000 to 20,000. If the weight average molecular weight of the polymer binder is less than 5,000, the strength or hardness of a color filter may be lowered. If the weight average molecular weight of the polymer binder exceeds 50,000, viscosity of the polymer binder is excessively increased, resulting in deterioration of a dispensing property or straightness of a discharge direction of the polymer binder at an inkjet nozzle.

Specifically, 5 to 15 wt % of polymer binder according to the present invention is included in the ink for a color filter. If the content of the polymer binder is less than 5 wt %, there are problems in that due to a too low viscosity, it is difficult to obtain a desired thickness of a color filter and heat resistance or surface hardness of the color filter is lowered. If the content of the polymer binder exceeds 15 wt %, then due to a too high viscosity, it is difficult to obtain uniform flatness of a color filter.

The crosslinking monomer is included to impart hardness sufficient to form a color filter from the ink after coating the ink for a color filter. A useful crosslinking monomer comprises a multifunctional epoxy resin with two or more epoxy groups on each molecule.

Although an epoxy group may be introduced into the main polymer of the polymer binder represented by Formula 2, there is a limit to the number of epoxy groups that can be introduced into molecules of the main polymer. That is, since an epoxy group introduced into the main polymer may not be present in an amount sufficient to provide a sufficient degree of cure, the ink for the color filter desirably comprises a crosslinking monomer comprising a multifunctional epoxy resin. This supplements an epoxy group in an ink composition to increase concentration at a reaction point of epoxy, thereby increasing a crosslinking density.

The multifunctional epoxy resin includes bisphenol A epoxy resin, hydroquinone epoxy resin, bisphenol F epoxy resin, brominated bisphenol A epoxy resin, bisphenol S epoxy resin, diphenyl ether epoxy resin, naphthalene epoxy resin, biphenyl epoxy resin, fluorine epoxy resin, phenol novolac epoxy resin, ortho-cresol novolac epoxy resin, trishydroxy phenylmethane epoxy resin, trifunctional epoxy resin, tetraphenyl ethane epoxy resin, dicyclopentadiene epoxy resin, polypropylene glycol epoxy resin, glycidyl ester epoxy resin, glycidyl amine epoxy resin, glyoxal epoxy resin, cycloaliphatic epoxy resin, or heterocyclic epoxy resin.

The crosslinking monomer may further comprise a thermally curable melamine derivative. For example, the melamine derivative includes hexamethoxymethyl melamine, hexabutoxymethyl melamine, and condensed hexamethoxymethyl melamine.

Furthermore, the crosslinking monomer may further comprise 1,4-butanediol diacrylate, 1,3-butyleneglycol diacrylate, ethyleneglycol diacrylate, pentaerythritol tetraacrylate, triethyleneglycol diacrylate, polyethyleneglycol diacrylate, dipentaerythritol diacrylate, sorbitol triacrylate, trimethylol propane triacrylate, dipentaerythritol polyacrylates, or dipentaerythritol polymethacrylates.

Specifically, 2 to 8 wt % of crosslinking monomer is included in the ink for a color filter. If the content of the crosslinking monomer is less than 2 wt %, it is difficult to obtain a sufficiently high crosslinking density and various resistances (heat resistance, solvent resistance, etc.) are reduced. If the content of the crosslinking monomer is greater than 8 wt %, the characteristics of the color filter prepared therewith become unstable and the adhesion property of the color filter is degraded.

The solvent is added to prepare a coating solution of the polymer binder and the crosslinking monomer, and may include a general solvent and a solvent containing a hydrophilic group such as, in an exemplary embodiment, a hydroxy group.

The general solvent includes n-butyl acetate, isobutyl acetate, ethylene glycol monomethyl ether acetate, ethylene glycol n-butyl ether acetate, diethylene glycol dimethyl ether, dipropylene glycol monomethyl ether acetate, diethylene glycol methylethyl ether, diethylene glycol ethyl ether acetate, dipropylene glycol n-butyl ether, tripropylene glycol n-propyl ether, tripropylene glycol methyl ether, propylene glycol methyl ether acetate, propylene glycol diacetate, propylene glycol monoethyl ether, propylene glycol monoethyl ether acetate, cyclohexanone, 3-methoxy propionic acid ethyl, 3-ethoxy propionic acid methyl, 3-ethoxy propionic acid ethyl, or a combination comprising at least one of the foregoing general solvents, which are used for dispersion and coating stability.

Furthermore, the solvent containing a hydrophilic group may include diethylene glycol ethyl ether, diethylene glycol 2-ethylhexylether, diethylene glycol hexyl ether, diethylene glycol methyl ether, diethylene glycol butyl ether, dipropylene glycol tert-butyl ether, dipropylene glycol methyl ether, dipropylene glycol propyl ether, tripropylene glycol, tripropylene glycol butyl ether, tripropylene glycol methyl ether, or tripropylene glycol propyl ether, or a combination comprising at least one of the foregoing solvents.

The solvent containing a hydrophilic group disperses and stabilizes the pigment, and improves the color ink's characteristics of contact with a coating surface, particularly, wettability of the color ink on a glass substrate during coating of the color ink, by increasing hydrophilicity due to the presence of the hydrophilic group (e.g., hydroxy group).

Specifically, the solvent has a boiling point of 230 to 250° C. to improve the ink discharging (also referred to herein as "dispensing") property of an inkjet head and to obtain proper drying and evaporation properties. Where the ink comprises such a solvent, the ink does not dry rapidly when discharged from the inkjet head. Thus, the viscosity of the ink does not rapidly increase upon dispense and there is no undesirable effect on straightness or stability of ink discharge. Furthermore, since the solvent is desirably volatilized not rapidly but at controlled rate after the ink is coated on a glass substrate, the ink is uniformly spread on the glass substrate. If the boiling point of the solvent is relatively low (i.e., less than 230° C.), the ink cannot be spread uniformly on the glass substrate due to a rapid increase in the viscosity of the ink during coating of the ink. If the boiling point of the solvent is relatively high (i.e., greater than 250° C., the solvent may remain after a drying process.

The pigment includes azo pigments, anthraquinone pigments, indigo pigments and phthalocyanine pigments, for implementing red (R), green (G) and blue (B) colors of a pixel part. The pigment may include compounds classified as pigments in Color Index (CI) published by The Society of Dyers and Colorists. For instance, exemplary yellow pigments include C.I. 20, C.I. 24, C.I. 83, C.I. 86, C.I. 93, C.I. 109, C.I. 110, C.I. 117, C.I. 125, C.I. 137, C.I. 138, C.I. 139, C.I. 147, C.I. 148, C.I. 153, C.I. 154, C.I. 166, and C.I. 168; exemplary red pigments include C.I. 9, C.I. 97, C.I. 122, C.I. 123, C.I. 149, C.I. 168, C.I. 177, C.I. 180, C.I. 192, C.I. 215, C.I. 216, C.I. 217, C.I. 220, C.I. 223, C.I. 224, C.I. 226, C.I. 227, C.I. 228, C.I. 240, and C.I. 254; exemplary jade pigments include C.I. 19, C.I. 23, C.I. 29, C.I. 30, C.I. 37, C.I. 40, and C.I. 50; exemplary blue pigments include C.I. 15, C.I. 22, C.I. 60, and C.I. 64; and exemplary green pigments include C.I. 7 and C.I. 36.

The pigment according to the present invention is provided as a pigment dispersion, which is a mixture of the pigment with a dispersant and a solvent to achieve dispersion stability. The solids of the pigment dispersion are determined based on the combination of pigment and dispersant, and the total solids (i.e., the combined pigment and dispersant) for the pigment dispersion is 15 to 20 wt % based on the total weight of the pigment dispersion. The wt % of the pigment may be 10 to 19, and the wt % of the dispersant may be 1 to 10.

Specifically, the ink for a color filter comprises 40 to 50 wt % of pigment dispersion. If the content of the pigment dispersion is less than 40 wt %, it is difficult to obtain transmitted light with a desired color, color saturation and color luminance since a color tone is not expressed properly. If the content of the pigment dispersion exceeds 50 wt %, physical properties of the color filter deteriorate.

A polymerization initiator is included to generate active species such as radicals, anions, and cations for initiating polymerization. The polymerization initiator is used by decomposing or binding using light or heat, and can include a known photopolymerization initiator or thermal polymerization initiator.

The photopolymerization initiator includes non-imidazole based compounds, benzoin-based compounds, acetophenone-based compounds, benzophenone-based compounds, α-diketone based compounds, polynuclear quinone-based compounds, xanthone-based compounds, diazo-based compounds, triazine-based compounds, or a combination comprising at least one of the foregoing compounds. Exemplary photopolymerization initiators may include benzoins such as benzoin, benzoin methyl ether, benzoin ethyl ether, and other alkyl ethers of benzoin; acetophenones such as acetophenone, 2,2-dimethoxy-2-phenylacetophenone, and 1,1-dichloroacetophenone; anthraquinones such as 2-methylanthraquinone, 2-amylanthraquinone, 2-t-butylanthraquinone, and 1-chloroanthraquinone; thioxanthones such as 2,4-dimethylthioxanthone, 2,4-diisopropylthioxanthone, and 2-chlorothioxanthone; ketals such as acetophenone dimethylketal and benzyl dimethylketal; benzophenones such as benzophenone; triazines such as 2(2'-furylethylidene)-4,6-bis(trichloromethyl)-s-triazine and 2 [2'(5'-methylfuryl)ethylidene]-4,6-bis(trichloromethyl)-s-triazine; 2,2'-bis(o-chlorophenyl)-4,4'; 5,5'-tetraphenylbisimidazone; and the like, or a combination comprising at least one of the foregoing compounds.

Thermal polymerization initiators include hydroquinone, hydroquinone monomethyl ether, tert-butylcatechol, pyrogallol, and phenothiazine. In an exemplary embodiment, the thermal polymerization initiator may include azo compounds such as 2,2'-azobis isobutyronitrile, 2,2'-azobis-(2,4-dimethyl-valeronitrile), 2,2'-azobis-(4-methoxy-2,4-dimethylvaleronitrile), and 1,1'-azobis-1-cyclohexylnitrile; organic peroxides such as benzoyl peroxide, t-butyl peroxide, and 1,1'-bis-(t-butylperoxy) cyclohexane; and the like; or a combination comprising at least one of the foregoing compounds.

A single polymerization initiator, or a combination of polymerization initiators may be used.

Specifically, 0.5 to 1 wt % of polymerization initiator is included in the ink for a color filter. If the content of the polymerization initiator is less than 0.5 wt %, it is difficult to obtain a sufficiently high crosslinking density, and various resistances (e.g., heat resistance, solvent resistance, etc.) deteriorate. On the other hand, if the content of the polymerization initiator exceeds 1 wt %, there are problems in that characteristics of a color filter become unstable, e.g., the adhesion property of the color filter is degraded, and long-term storage stability deteriorates.

As described above, the ink for a color filter according to the present invention comprises the polymer binder including hydroxy-containing acrylate or methacrylate monomer, the crosslinking monomer, the solvent, the pigment dispersion, and the polymerization initiator. Moreover, the ink for a color filter according to the present invention may further comprise additives such as a colorant, a dye, an anti-striation agent, a plasticizer, an adhesion promoting agent, a wetting agent, a surfactant, or a combination comprising at least one of the foregoing additives, as desired.

The ink for a color filter according to the present invention can have improved contact characteristics on a black matrix (BM) wall surface or a glass substrate by controlling the polarity of the polymer binder. That is, since the ink for a color filter contains a number of hydrophilic groups sufficient to increase wettability on the black matrix (BM) wall surface or the glass substrate, a coated color ink can be uniformly spread on the glass substrate inside a pixel and the formation of curvature in the color filter, specifically convex curvature of the surface of the cured ink of the color filter, can be prevented. A color filter pixel prepared in this way has low curvature (i.e., improved flatness) when compared to a color filter pixel prepared using a polymer binder without hydroxy groups. Furthermore, since the ink for a color filter contains the hydroxy group and comprises the solvent with a relatively high boiling point, the ink has an improved ink dispensing property and proper drying and evaporation properties, thereby allowing the coated color ink to be uniformly spread to form a flattened surface. Therefore, color uniformity is improved through flattening of a color filter and reliability is improved by preventing color mixing.

Hereinafter, a method of fabricating the ink for a color filter according to the present invention will be described.

In order to incorporating a pigment with an ink for a color filter according to the present invention, a solvent having good pigment dispersibility and dispersion stability is used. A pigment and a dispersant are added to the solvent and stirred to prepare a pigment dispersion. The pigment dispersion so prepared includes 15 to 20 wt % of solid components comprising the pigment and the dispersant, based on the total weight of the pigment dispersion.

The prepared pigment dispersion, a polymer binder, a crosslinking monomer and a polymerization initiator are added to the pigment dispersion and sufficiently stirred in such a solvent. In an embodiment, the ink comprises 5 to 15 wt % of polymer binder, 2 to 8 wt % of crosslinking monomer, 40 to 50 wt % of pigment dispersion, and 0.5 to 1 wt % of polymerization initiator, where the amount of each component is based on the total weight of pigment dispersion, polymer binder, crosslinking monomer, polymerization initiator, and solvent.

The ink for a color filter may be fabricated by mixing the pigment dispersion, the polymer binder, the crosslinking monomer, and the polymerization initiator in a state where the reminder of solvent, except the solvent included in the pigment dispersion, has not been mixed in advance so as to prepare and keep a composition with high concentration; and by adding the remainder of solvent to the composition to dilute it to a final concentration just before use.

Hereinafter, the present invention will be described in greater detail in connection with examples Comparative Example An ink for a color filter was prepared by dissolving and uniformly mixing 10 wt % of a polymer binder including glycidyl methacrylate ("GMA"), benzyl methacrylate ("BZMA") and cyclohexyl methacrylate at a weight ratio of 40:30:30 respectively, 4 wt % of a cross-linking monomer, 40 wt % of a pigment dispersion and 0.5 wt % of a thermal polymerization initiator in 45.5 wt % of a 3:7 w/w propylene glycol methyl ether acetate ("PGMEA")/ethyl beta-ethoxy propionate ("EEP") solvent. Epikote® 828 (available from Japan Epoxy Resins Co., Ltd.), i.e., bisphenol A epoxy resin, was used as the cross-linking monomer, C.I. 254 red pigment was used as the pigment, and 2-cyclohexanonyl methyl sulfonium salt was used as the thermal polymerization initiator.

The prepared color ink had a viscosity of 10 centipoise (cP) and a solids concentration of 18% by weight based on the total weight of the ink.

Example

An ink for a color filter was prepared by dissolving and uniformly mixing 12 wt % of a polymer binder including benzyl methacrylate (BZMA), methyl acrylate ("MA") and 2-hydroxyethyl methacrylate ("HEMA") at a weight ratio of 52:32:16 respectively, 4 wt % of a cross-linking monomer, 40 wt % of a pigment dispersion and 0.5 wt % of a thermal polymerization initiator in 43.5 wt % of tripropylene glycol methyl ether solvent. Epikote® 828 (available from Japan Epoxy Resins Co., Ltd.), i.e., bisphenol A epoxy resin, was used as the cross-linking monomer, C.I. 254 red pigment was used as the pigment, and 2-cyclohexanonyl methyl sulfonium salt was used as the thermal polymerization initiator. The prepared color ink had a viscosity of 10.4 cP and a solid concentration of 18.6% based on the total weight of the ink.

In the aforementioned comparative example and example, the inks were prepared by using the equivalent amounts by weight of the cross-linking monomer, a pigment dispersion, and thermal polymerization initiator, but changing the composition of the polymer binder and the solvent. The properties of the inks thus obtained were compared with each other.

A drop of each of the inks according to the aforementioned comparative example and example was dispensed through an inkjet nozzle onto a glass substrate with organic black matrix (BM) patterns formed thereon, and contact characteristics of the drops of the inks were examined.

Figure 2A:
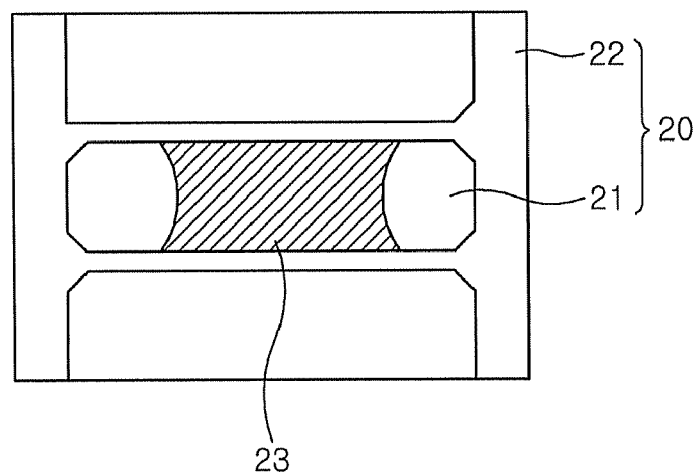
FIGS. 2A and 2B are schematic plan views for comparison of cases where an ink for a color filter according to a comparative example and an ink for a color filter according to an example were deposited into a pixel of organic black matrix (BM) patterns, respectively.
Figure 2B:
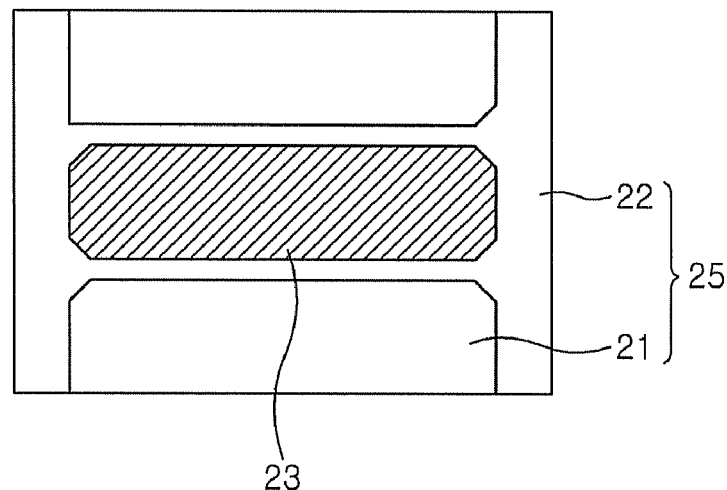
Figure 3A:
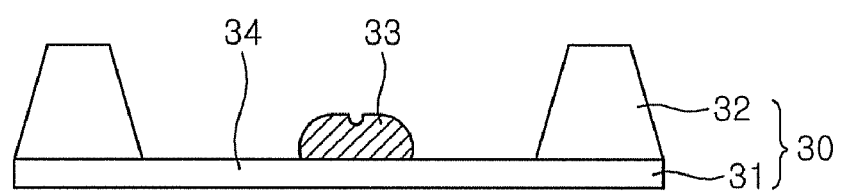
FIGS. 3A and 3B are schematic sectional views for comparison of the cases where the ink for a color filter according to the comparative example and the ink for a color filter according to the example were dropped into the pixel of the organic black matrix (BM) patterns, respectively.
Figure 3B:
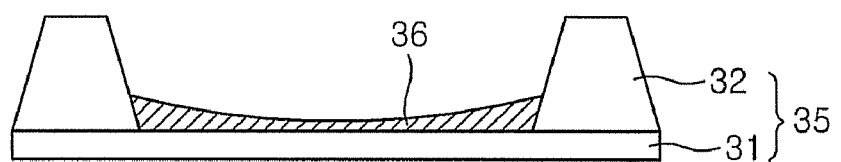

FIGS. 2A and 2B are schematic plan views for comparison of cases where the ink for a color filter according to the comparative example (FIG. 2A) and the ink for a color filter according to the example (FIG. 2B) were dispensed into a pixel of organic black matrix (BM) patterns, respectively, and FIGS. 3A and 3B are schematic sectional views for comparison of the cases where the ink for a color filter according to the comparative example (FIG. 3A) and the ink for a color filter according to the example (FIG. 3B) were dispensed into the pixel of the organic black matrix (BM) patterns, respectively.

Referring to FIG. 2A, the color ink 23 of the comparative example was not uniformly spread on the glass substrate 21, resulting in formation of a region in which the ink 23 was not coated. Furthermore, the ink was hardened at a position to which the ink was discharged, thereby forming an uneven surface. This is because the ink 23 coated on the glass substrate 21 was hardened at a high rate due to rapid evaporation of the solvent having poor wettability on a glass substrate and a relatively low boiling point. In addition, in FIG. 3A, the non-uniform distribution of comparative example ink 33 on glass surface 31 is shown in cross sectional view, where the ink 33 does not spread uniformly across the surface 34 of glass substrate 31 or come into contact with black matrix pattern 32.

On the other hand, referring to FIG. 2B in a top-down view of pixel 25, it can be seen that the ink 24 of the example was uniformly spread on an entire exposed surface of the glass substrate 21 within the pixel opening and reached a wall surface of black matrix (BM) 22, and had superior wettability on the glass substrate 21 and the wall surface of the black matrix (BM) 22. In FIG. 3B, in a cross-sectional view of pixel 35, ink 36 of the example was uniformly spread on an entire surface of the glass substrate 31, reaching a wall surface of black matrix (BM) 32, and having superior wettability on the glass substrate 31 and wall surface of the black matrix (BM) 32.

Furthermore, the ink has an advantage of improvement in uniformity of a color filter through the formation of a flattened surface. This is because the ink coated on the glass substrate was hardened after the solvent having a relatively high boiling point was volatilized not rapidly but at a slower rate (relative to solvents having a boiling point less than 230° C.) and then uniformly spread. Additionally, this is because the wettability of the ink on a glass substrate and on the wall surface of a black matrix (BM) was improved due to the use of a polymer binder containing a sufficiently high number of hydrophilic groups.

As described above, the ink for a color filter according to the present invention can have improved contact characteristics on the wall surface of the black matrix (BM) or the glass substrate by controlling the polarity of the polymer binder. That is, since the ink contains a sufficiently high number of hydrophilic groups and thus has the improved wettability on the wall surface of the black matrix (BM) or the glass substrate, the coated ink can be uniformly spread on portions of the glass substrate in pixels to prevent the formation of a curvature in a color filter. Furthermore, with the use of the solvent containing hydroxy groups and having a relatively high boiling point, the ink of the present invention has an improved ink dispensing property and proper drying and evaporation properties, thereby allowing the coated ink to be uniformly spread and to form a flattened surface. Therefore, the flattening of the color filter improves color uniformity and prevents color mixing, resulting in improved reliability.

Hereinafter, a method of fabricating a color filter according to the present invention will be described.

Figure 4:
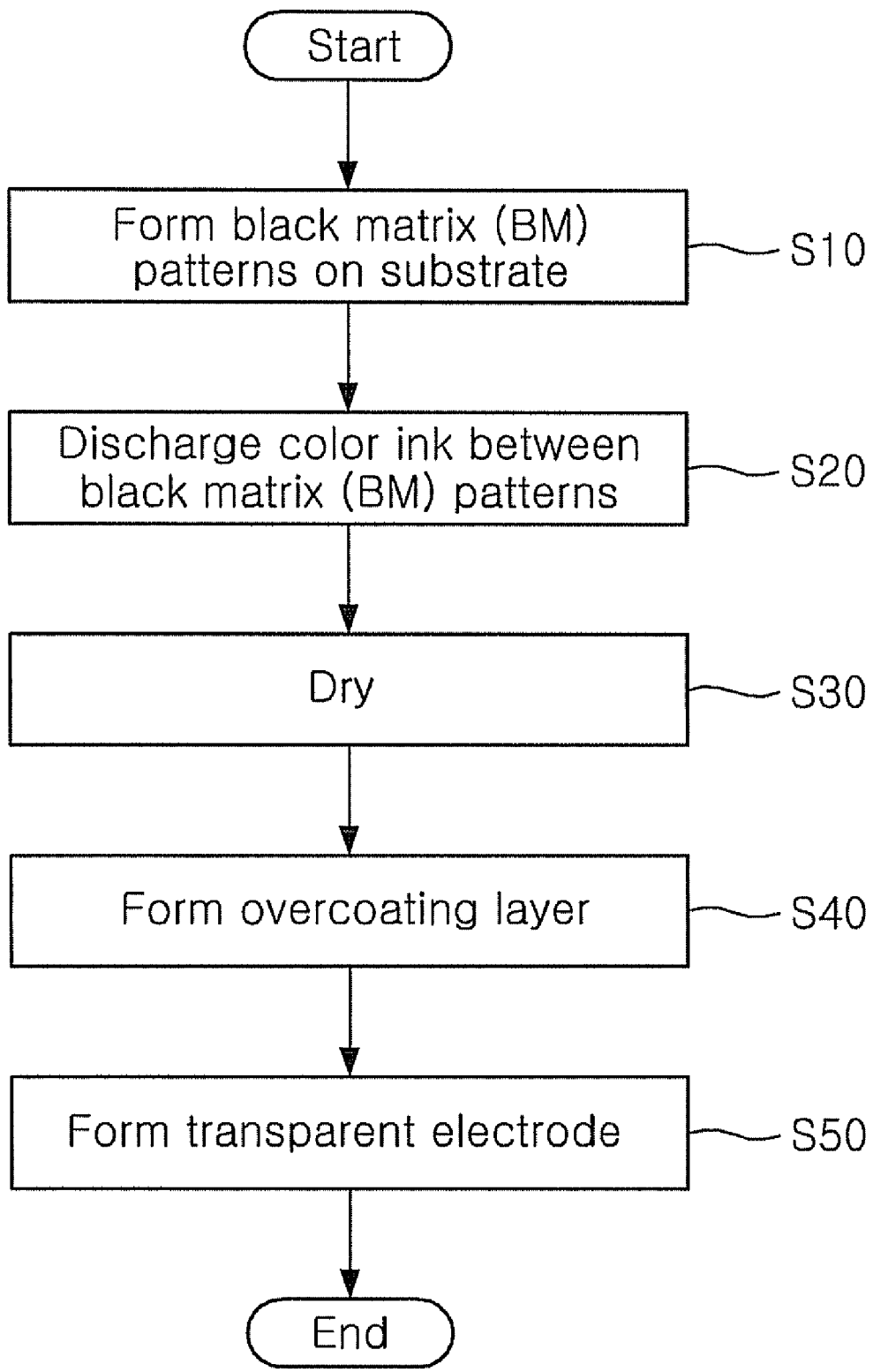
FIG. 4 illustrates the process flow for a method of fabricating a color filter.

FIG. 4 is an illustration of a process flow for the method of fabricating the color filter according to the present invention.

Referring to FIG. 4, black matrix (BM) patterns are formed on a substrate (S10), and red (R), green (G) and blue (B) inks for a color filter are discharged between the patterns by means of an inkjet printing method (S20). The ink is dried and cured (S30), an overcoating layer is formed on a top surface of the cured ink (S40), and a common electrode is formed on the overcoating layer (S50). A color filter can be fabricated in this way.

Figure 5A:
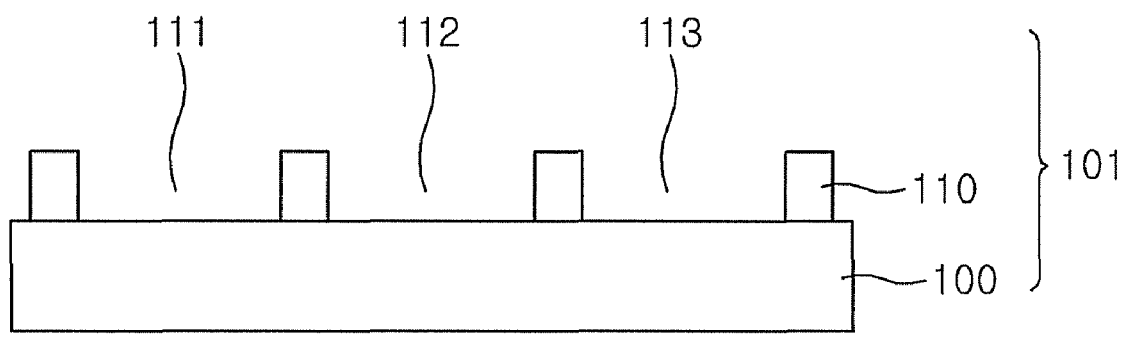
FIGS. 5A to 5E are sectional views illustrating the method of fabricating the color filter.
Figure 5B:
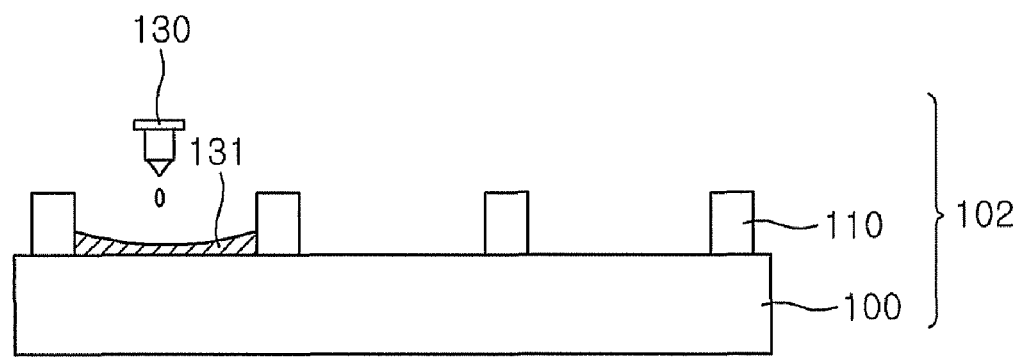
Figure 5C:
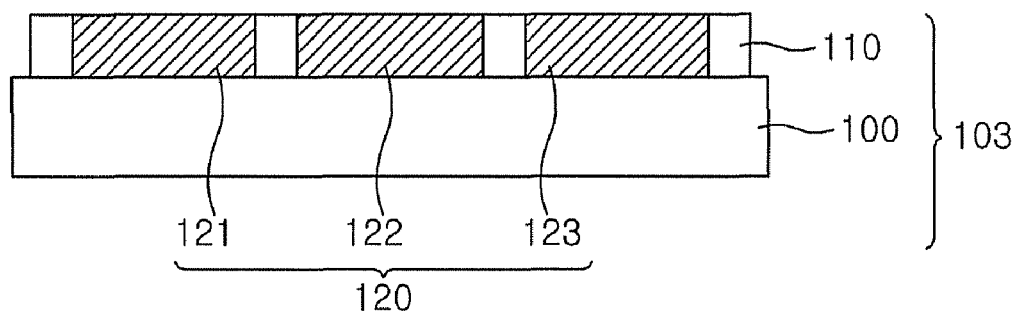
Figure 5D:
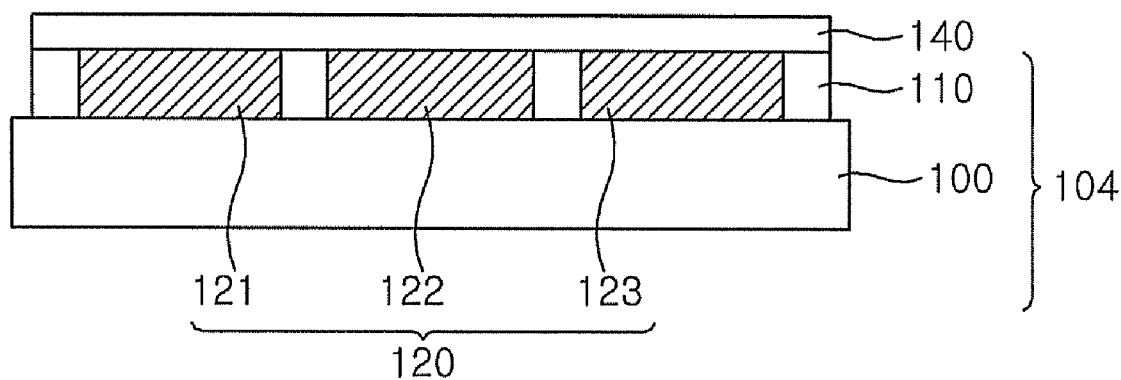
Figure 5E:
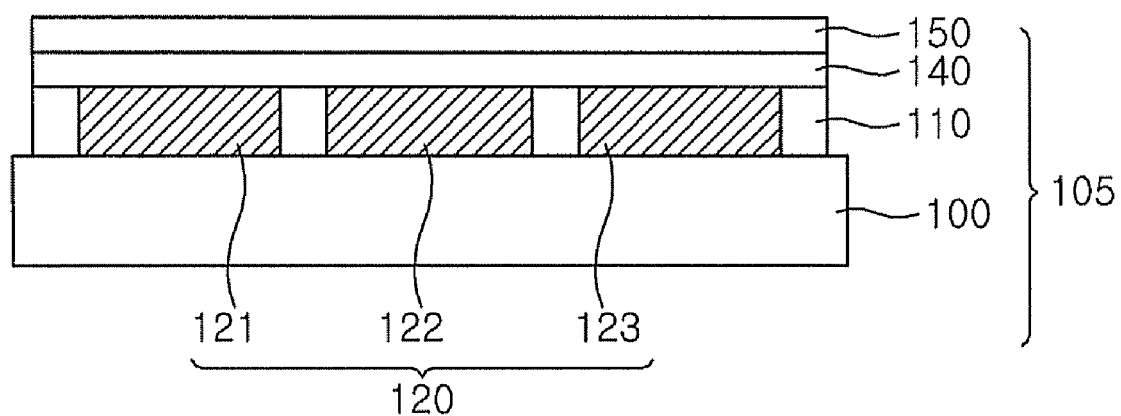

FIGS. 5A to 5E are sectional views illustrating the method of fabricating the color filter 105 (in FIG. 5E).

In the method, in structure 101 in FIG. 5A, black matrix patterns 110 are formed by depositing an organic black matrix material on a substrate 100, and patterning the organic black matrix material deposited on the substrate using a mask. The black matrix patterns 110 may be patterned to have lattice-structures for dividing respective color layers of a color filter into pixel units on a plane.

The black matrix patterns 110 should have high light absorption. The black matrix patterns 110 are desirably formed of an opaque, highly light absorbing organic material since the use of chromium (Cr) which otherwise has desirable properties in a black matrix, is restricted by environmental regulations. The black matrix patterns 110 in this embodiment are formed using an opaque resin.

Since color inks are deposited within the black matrix patterns 110, the black matrix patterns 110 are formed to have a thickness larger than a desired thickness of a color filter to prevent mixing of the color inks.

The black matrix patterns 110 are placed at the desired boundaries of color layers of the color filter, which represent red, green and blue, and function to improve contrast in an entire LCD by blocking light in regions that are not controlled by pixel electrodes.

Next, a color filter 120 is formed between the black matrix patterns 110 using an inkjet printing method. Referring to structure 102 in FIG. 5B, the aforementioned ink is dispensed using an inkjet head 130 into a first pixel region 111 independently surrounded by the black matrix patterns 110. Since the ink of the present invention has superior wettability on wall surfaces of the black matrix patterns 110 and a glass substrate 100 due to the presence of hydrophilic groups in the polymer binder, it is uniformly spread and coated without formation of a curvature. A suitable amount of ink 131 is dispensed such that the ink does not overflow to a neighboring pixel region.

A red color ink is thus dispensed into a first pixel region 111 of black matrix pattern 110 and then dried and cured to form a red color filter 121. A green color ink is dispensed into a second pixel region 112 adjacent to the first pixel region 111 in which the red color filter 121 has been formed, and then dried and cured to form a green color filter 122. In a similar way, a blue color ink is dispensed into a third pixel region 113 adjacent to the second pixel region 112, dried, and cured to form a blue color filter 123.

The process of forming the color filter 120 is not limited thereto but may be variously modified in view of the ink dispense sequence and positions of the inks according to convenience of the process. For example, individual red, green, and blue color filters 121, 122 and 123 may be formed by simultaneously dispensing red, green, and blue inks using a plurality of inkjet heads for dispensing the inks for the respective color filters, and drying and curing the inks. In this case, there is a advantage that may be realized in that processing time can be reduced.

Color filters for representing respective colors may be formed at various positions. Further, color filters with the same color may be longitudinally or diagonally formed between the lattice-black matrix patterns. Furthermore, referring to structure 103 in FIG. 5C, the red, green and blue color filters 121, 122 and 123 may be formed such that the respective color filters have the same size and are spaced apart from one another as illustrated in the FIGS. 5A to 5E, have different thicknesses according to the characteristics of the color filters, or overlap with each other.

In FIG. 5C, the color filters 121, 122 and 123 that represent the respective colors are separated from one another by the black matrix patterns 110 as boundaries. With the use of an ink containing hydrophilic groups, the present invention can prevent the formation of a curvature in a color filter within a pixel and improve uniformity of the color filter. Therefore, color uniformity is improved through flattening of a color filter and reliability is improved by preventing color mixing.

Referring to structure 104 in FIG. 5D, an overcoating layer 140 is formed on entire surface of the black matrix patterns 110 and the color filter 120 opposite the substrate 100. The overcoating layer 140 can be formed of acrylic resin or the like to prevent leaching of an organic material from the color filter 120 to adjacent liquid crystal cells (not shown) and to obtain good step coverage during formation of a common electrode.

Referring to FIG. 5E, a transparent electrode 150 is formed on an entire surface of the overcoating layer 140 opposite the black matrix patterns 110 and color filter 120. The transparent electrode 150 is desirably formed of indium tin oxide ("ITO") or indium zinc oxide ("IZO"). In this way, color filter 105 (FIG. 5E) is provided.

According to the present invention described above, an ink for a color filter containing hydrophilic groups is used during fabrication of a color filter by an inkjet printing method, so as to improve wettability of the ink on wall surfaces of black matrix patterns and a glass substrate, and thereby preventing formation of a curvature in a color filter within a pixel and forming a flattened surface of a color filter after cure. Accordingly, there are advantages in that it is possible to improve color uniformity and color purity, resulting in improved reliability. A color filter having improved color uniformity therefore comprises a patterned organic black matrix having wall surfaces, and the cure product of the ink for color filter of the present invention. The cure product of the ink is disposed within the patterned organic black matrix in contact with the wall surfaces, and both are disposed on a surface of a substrate.

Although the present invention has been described in connection with the preferred embodiments, the scope of the present invention is not limited thereto but should be construed based on the appended claims. Further, it will be readily understood by those skilled in the art that various modifications and changes can be made thereto without departing from the spirit and scope of the present invention.

What is claimed is:

1. An ink for a color filter, comprising:
 a polymer binder,
 a crosslinking monomer,
 a solvent,
 a pigment, and
 a polymerization initiator,
 wherein the polymer binder consists of a main polymer of Formula 1 or Formula 2, wherein a hydroxy group containing acrylate or methacrylate monomer of the polymer binder is 10 to 50% by weight, based on the total weight of the polymer binder:

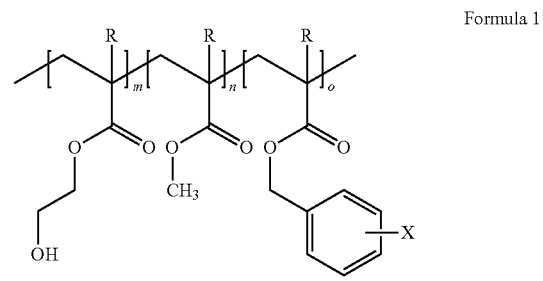

Formula 1 wherein R is hydrogen or a methyl group, X is hydrogen, a $C_{1-18}$ alkyl group, a $C_{6-18}$ aryl group, a halogen group, a nitro group, or a $C_{1-18}$ alkoxy group, and each of m, n, and o is independently an integer that is greater than 1 and less than or equal to 10,000;

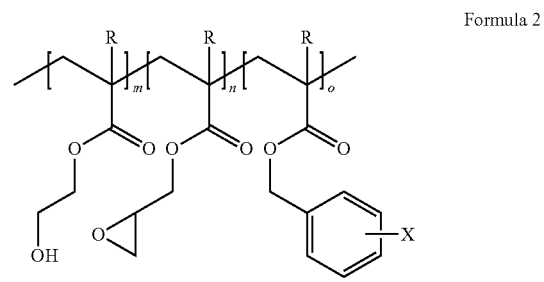

Formula 2 wherein, R is hydrogen or a methyl group, X is hydrogen, a $C_{1-18}$ alkyl group, a $C_{6-18}$ aryl group, a halogen group, a nitro group, or a $C_{1-18}$ alkoxy group, and each of m, n, and o is independently an integer that is greater than 1 and less than or equal to 10,000.

2. The ink of claim 1, wherein the polymer binder has a weight-average molecular weight of 15,000 to 20,000.

3. The ink of claim 1, wherein the crosslinking monomer comprises a multifunctional epoxy resin with two or more epoxy groups on each molecule.

4. The ink of claim 3, wherein the crosslinking monomer further comprises a melamine derivative.

5. The ink of claim 3, wherein the crosslinking monomer further comprises 1,4-butandioldiacrylate, 1,3-butylenegly-coldiacrylate, ethylene glycol diacrylate, pentaerythritol tetraacrylate, triethylene glycol diacrylate, polyethylene glycol diacrylate, dipentaerythritol diacrylate, sorbitol triacrylate, trimethylol propane triacrylate, dipentaerythritol polyacrylates, or dipentaerythritol polymethacrylates, or a combination comprising at least one of the foregoing crosslinking monomers.

6. The ink of claim 1, wherein the solvent comprises diethylene glycol ethyl ether, diethylene glycol 2-ethylhexyl ether, diethylene glycol hexyl ether, diethylene glycol methyl ether, diethylene glycol butyl ether, dipropylene glycol tert-butyl ether, dipropylene glycol methyl ether, dipropylene glycol propyl ether, tripropylene glycol, tripropylene glycol butyl ether, tripropylene glycol methyl ether, tripropylene glycol propyl ether, or a combination comprising at least one of the foregoing solvents.

7. The ink of claim 6, wherein the solvent has a boiling point of 230 to 250° C.

8. The ink of any one of claim 1, wherein the pigment is provided as a pigment dispersion comprising 15 to 20 wt % of solids based on the total weight of pigment dispersion, wherein the solids comprises a combination of the pigment and a dispersant.

9. The ink of claim 8, wherein the ink comprises 5 to 15 wt % of polymer binder, 2 to 8 wt % of crosslinking monomer, 40 to 50 wt % of the pigment dispersion, and 0.5 to 1 wt % of the polymerization initiator, based on the total weight of polymer binder, crosslinking monomer, pigment dispersion, polymerization initiator, and solvent.

10. The ink of claim 1, wherein the ink contains a number of hydrophilic groups sufficient to wet a black matrix wall surface and a glass substrate.

11. A color filter comprising the cure product of the ink of claim 1.

12. A method of fabricating a color filter, comprising:
    forming black matrix patterns on a surface of a substrate; and
    forming a color filter by dispensing an ink within the black matrix patterns, wherein the ink comprises
    a polymer binder,
    a crosslinking monomer,
    a solvent,
    a pigment, and
    a polymerization initiator,
    wherein the polymer binder consists of a main polymer of Formula 1 or Formula 2, wherein a hydroxy group containing acrylate or methacrylate monomer of the polymer binder is 10 to 50% by weight, based on the total weight of the polymer binder:

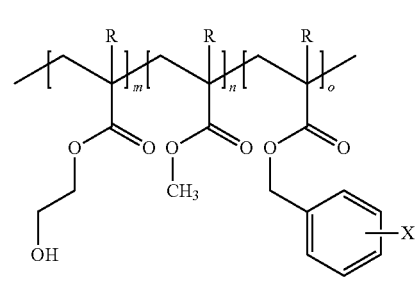

Formula 1 wherein R is hydrogen or a methyl group, X is hydrogen, a $C_{1-18}$ alkyl group, a $C_{6-18}$ aryl group, a halogen group, a nitro group, or a $C_{1-18}$ alkoxy group, and each of m, n, and o is independently an integer that is greater than 1 and less than or equal to 10,000;

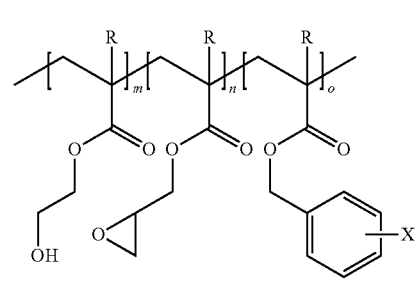

Formula 2 wherein, R is hydrogen or a methyl group, X is hydrogen, a $C_{1-18}$ alkyl group, a $C_{6-18}$ aryl group, a halogen group, a nitro group, or a $C_{1-18}$ alkoxy group, and each of m, n, and o is independently an integer that is greater than 1 and less than or equal to 10,000.

13. The method of claim 12, wherein the ink is uniformly spread on the substrate, and wherein a color filter pixel prepared thereby has low curvature when compared to a color filter pixel prepared using a polymer binder without hydroxy groups.

14. The method of claim 12, wherein the black matrix patterns are formed of an opaque organic material.

15. The method of claim 12, further comprising:
    forming an overcoating layer on a surface of the black matrix patterns and the color filter opposite the substrate; and
    forming a transparent electrode on a surface of the overcoating layer opposite the black matrix patterns and color filter.

16. A color filter fabricated by the method of claim 12.

17. A color filter, comprising:
    a patterned organic black matrix having wall surfaces, and
    a cure product of an ink comprising
    a polymer binder,
    a crosslinking monomer,
    a solvent,
    a pigment, and
    a polymerization initiator;
    wherein the cure product of the ink is disposed within the patterned organic black matrix and in contact with the wall surfaces, and the patterned black matrix and cure product of the ink are disposed on a surface of a substrate,
    wherein the polymer binder consists of a main polymer of Formula 1 or Formula 2, wherein a hydroxy group containing acrylate or methacrylate monomer of the polymer binder is 10 to 50% by weight, based on the total weight of the polymer binder:

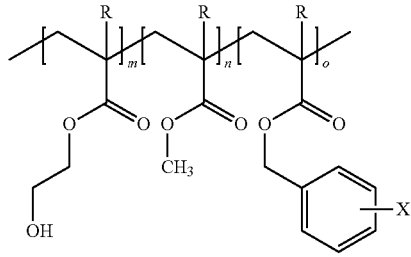

Formula 1 wherein R is hydrogen or a methyl group, X is hydrogen, a $C_{1-18}$ alkyl group, a $C_{6-18}$ aryl group, a halogen group, a nitro group, or a $C_{1-18}$ alkoxy group, and each of m, n, and o is independently an integer that is greater than 1 and less than or equal to 10,000;

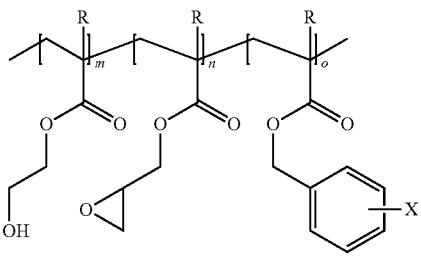

Formula 2 wherein, R is hydrogen or a methyl group, X is hydrogen, a $C_{1-18}$ alkyl group, a $C_{6-18}$ aryl group, a halogen group, a nitro group, or a $C_{1-18}$ alkoxy group, and each of m, n, and o is independently an integer that is greater than 1 and less than or equal to 10,000.

* * * * *